United States Patent [19]
O'Neill

[11] Patent Number: 4,923,094
[45] Date of Patent: May 8, 1990

[54] MANUALLY OPERATED PRESSURE BUILD-UP PUMP SPRAYER

[76] Inventor: Richard K. O'Neill, P.O. Box 2452, Wrightwood, Calif. 92397

[21] Appl. No.: 295,067

[22] Filed: Jan. 6, 1989

[51] Int. Cl.[5] .............................................. G01F 11/00
[52] U.S. Cl. .................................... 222/321; 222/378; 222/380; 222/383; 239/333
[58] Field of Search ........ 239/333; 222/321, 378–380, 222/383, 385

[56] References Cited

U.S. PATENT DOCUMENTS

| | | | |
|---|---|---|---|
| 3,908,870 | 9/1975 | Nozawa et al. | 222/321 |
| 4,017,031 | 4/1977 | Kishi et al. | 222/321 |
| 4,051,983 | 10/1977 | Anderson | 222/321 |
| 4,183,449 | 1/1980 | Blake | 222/321 |
| 4,189,064 | 2/1980 | O'Neill et al. | 222/385 |
| 4,317,531 | 3/1982 | Saito et al. | 222/321 |
| 4,365,729 | 12/1982 | Saito et al. | 222/321 |
| 4,462,549 | 7/1984 | Saito et al. | 222/321 |
| 4,821,928 | 4/1989 | Su | 222/321 |

*Primary Examiner*—Kevin P. Shaver
*Assistant Examiner*—Steven Rein
*Attorney, Agent, or Firm*—Morland C. Fischer

[57] ABSTRACT

A relatively low cost, manually actuated pressure build-up pump sprayer to be interfaced with a liquid container for atomizing and spraying any one of a variety of different liquids which may be stored within the container. The pump sprayer is characterized by a fewer number of components and a higher speed of assembly than that by which most conventional sprayers are characterized. The pump sprayer is also characterized by a single, axially and continuously extending pressure chamber and a continuously extending pair of bores having different diameters relative to one another. Moreover, the sprayer includes a number of seals which may be selectively opened and closed at particular times during the stroke cycle so as to provide the reliable venting and efficient priming in response to a lower actuating force.

20 Claims, 4 Drawing Sheets

MANUALLY OPERATED PRESSURE BUILD-UP PUMP SPRAYER

BACKGROUND OF THE INVENTION

1. Field of the Invention

This invention relates to a relatively low cost, rechargeable, manually operated pressure build-up pump sprayer that is assembled from a relatively few number of parts to dispense liquid in response to a relatively small actuating force. The pump sprayer herein described has particular application for atomizing and dispensing liquids, such as, hair products, deodorants, perfumes, cosmetic preparations, and the like.

2. Background Art

As will be known to those skilled in the art, the typical pressure build-up pump sprayer is manufactured from a relatively large number of parts. The large number of parts correspondingly results in a high manufacturing cost and an increase in the difficulty of manufacture, especially when molding of several parts is required. Moreover, these conventional pump sprayers are often difficult to assemble and, in some cases, have to be primed during assembly. Moreover, when the conventional sprayer is clogged with dried product, the continued operation thereof may cause some parts to disengage from one another rendering the sprayer inoperable. Some pump sprayers have ineffective or inefficient seals, such that leakage becomes a problem, particularly if the liquid container is turned upside down or if the spray head is depressed, even slightly. Other pump sprayers require the application of a large actuating force to depress the spray head which often leads to user discomfort, especially if the sprayer is to be used by those engaged in a task which requires that the sprayer be used over long periods of time. Still other pump sprayers must be stroked a large number of times before the sprayer is suitably primed to dispense a liquid spray, while a number of pump sprayers are undesirably characterized by a relatively short stroke or a correspondingly low volume spray output.

The presently disclosed pressure build-up pump sprayer overcomes the problems associated with the conventional pump sprayers by virtue of its fewer number of parts, reduced cost, capability of automatic and efficient assembly, desired pump stroke in response to minimal actuating pressure, and reliable venting and priming by which a relatively large volume of spray may be dispensed after only a small number of priming strokes.

SUMMARY OF THE INVENTION

In general terms, a rechargeable, manually operated pressure build-up pump sprayer is disclosed to be interconnected with a container for atomizing various liquids including, but not limited to, hair products, deodorants, perfumes, cosmetic preparations, and the like. The disclosed sprayer is manufactured from a relatively few number of parts at a reduced cost and can be more easily and quickly assembled when compared with conventional pump sprayers. More particularly, the pump sprayer of this invention comprises a removable protective hood, a cap to be detachably connected to a liquid container, a spring biased, hollow poppet or piston assembly adapted for reciprocal movement through the cap so that the sprayer can be primed and liquid dispensed through a spray orifice, and a spray head to which a manual actuating force is applied to control the reciprocal movement of the poppet through the cap.

The pump sprayer has a single, continuous pressure chamber extending axially through the cap and poppet thereof. By virtue of the single pressure chamber, the sprayer can be more easily and quickly primed with the application of less actuating force to the spray head. The cap of the sprayer is characterized by a pair of continuously connected, coaxially aligned bores of relatively large and small diameter through which the poppet slides during the up and down strokes of operation so as to control the opening and closing of a normally closed discharge valve through which liquid is delivered to the spray orifice from the pressure chamber during the down stroke. The cap is provided with a venting rib which is engaged by the spray head at a particular location during the down and up strokes to break a leak tight seal between the cap and head and thereby establish a passage through which atmospheric air is vented into the container to replenish fluid dispensed therefrom. The cap is also provided with an inwardly extending priming step which is engaged in the bore of relatively large diameter by an outwardly extending upper poppet flange so that the poppet flange is deflected as the poppet is moved downwardly through the pair of bores at the end of the down stroke to thereby establish a passage between the poppet and head through which trapped air within the pressure chamber is removed to the atmosphere to facilitate priming the sprayer. When the poppet is moved upwardly through the bores at the beginning of the up stroke, a resulting suction force causes a ball valve to be moved off its valve seat and a supply of liquid to be drawn into the pressure chamber by way of a valve opening and a suction tube extending from said chamber into the container.

DESCRIPTION OF THE PREFERRED EMBODIMENT

Figure 1:
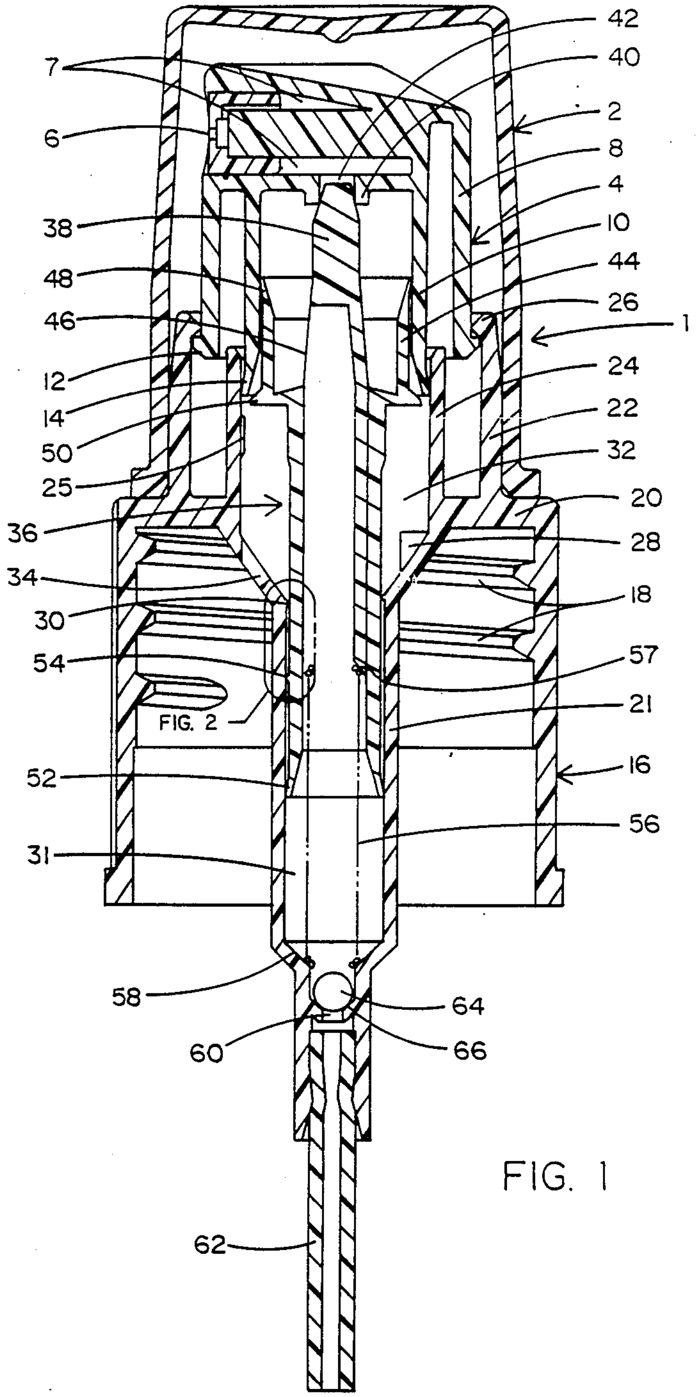
FIG. 1 is a vertical cross-sectional view of the fluid dispensing and atomizing pump sprayer which forms the present invention in the at rest condition.

The pressure build-up sprayer of the present invention for atomizing and dispensing a liquid is best described while referring to the drawings, where FIG. 1 shows the sprayer 1 in the at rest condition. The sprayer 1 includes a removable hood 2 which surrounds and protects a spray head 4. The spray head 4 has an orifice outlet 6 at the distal end thereof through which a liquid can be dispensed when the pump sprayer is primed and the head is depressed, as will be described in greater detail hereinafter. A fluid passage 7 formed through spray head 4 surrounds orifice outlet 6 to supply liquid to outlet 6 from a soon to be described axially aligned and continuously extending fluid pressure chamber. The head 4 also has axially extending outer and inner flanges 8 and 10. The outer flange of head 4 terminates at a proximally oriented, outwardly extending annular shoulder or stop 12, and the inner flange 10 terminates at a proximally oriented, outwardly flared flexible skirt 14.

The hood 2 is removably attached to and the spray head 4 is slidably interfaced with a closure or cap 16. The cap 16 is provided (e.g. molded) with a series of internal screw threads 18 by which the sprayer 1 may be rotated into detachable and mating engagement with a series of complementary screw threads from a container (not shown). The container is of the type that can be filled with a variety of different liquids including, but not limited to, hair products, deodorants, perfumes, cosmetic preparations, and the like. The cap 16 includes a radially extending flange 20 and a coextensively connected hollow accumulator 21 which extends axially and proximally from flange 20. Also coextensively connected to flange 20 and extending axially and distally therefrom are outer and inner walls 22 and 24. The outer and inner walls 22 and 24 of cap 16 are aligned in end to end engagement with and located proximally relative to the outer and inner flanges 8 and 10, respectively, of spray head 4. The outer wall 22 of cap 16 terminates at a distally oriented, inwardly extending annular shoulder or stop 26. During the soon to be described pressure build-up of sprayer 1 (best illustrated in FIGS. 3 and 5), the spray head 4 is moved axially and reciprocally with respect to cap 16 through successive up and down strokes. Accordingly, the annular shoulder 12 at the proximal end of the outer flange 8 of spray head 4 will ride along the outer wall 22 of cap 16 and the annular shoulder 26 at the distal end of outer wall 22 of end cap 16 will ride along the outer flange 8 of spray head 4, so that the spray head can be guided for smooth and continuous movement relative to cap 16. Likewise, the inner flange 10 of spray head 4 is adapted for axial movement relative to the cap 16, such that the flexible skirt 14 of head 4 rides along the inner wall 24 of cap 16 during up and down strokes of sprayer 1.

Figure 5:
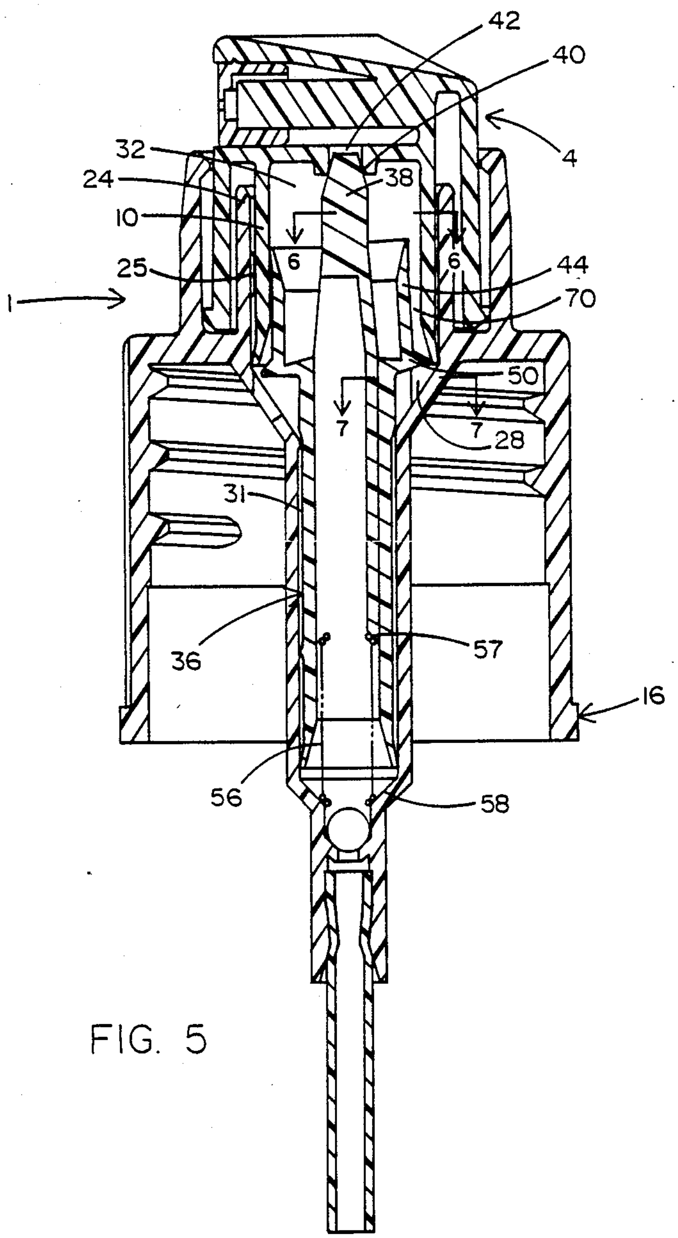
FIG. 5 is a vertical cross-sectional view of the pump sprayer of FIG. 1 at the bottom of the down stroke when trapped air is removed from the pressure chamber to the container to facilitate priming.

The cap 16 of sprayer 1 also includes an integral priming step 28 which (as is best illustrated in FIG. 5) extends radially into a hollow bore 32 of the cap. An accumulator rib 30 extends around the inner periphery of the accumulator 21 of cap 16. The hollow interior of accumulator 21 defines another bore 31 of sprayer 1, such that the cap 16 is characterized by first and second continuously extending and coaxially aligned bores 31 and 32. However, the diameter of the first bore 31 is less than the diameter of the second bore 32 (by a ratio of approximately 1:2). A vent hole 34 is formed through a generally sloping wall of cap 16 at the intersection of the first and second bores 31 and 32. The function of vent hole 34 will be described in greater detail hereinafter.

A hollow, tubular piston assembly or poppet 36 is received within and coaxially aligned with the continuously extending first and second bores 31 and 32 of cap 16 so as to be slidable therethrough. The poppet 36 is preferably formed from a relatively soft, medium density plastic material so as to be easily slidable through said pair of bores. The poppet 36 includes a distally projecting poppet valve 38. In the at rest condition of FIG. 1, the poppet valve 38 is located flush against an upper valve seat 40 and received within a normally closed valve opening 42 through the spray head 4. The receipt of poppet valve 38 against upper valve seat 40 and within normally closed upper valve opening 42 prevents the passage of liquid past the poppet valve 38 and through opening 42. However, and as will soon be described, the poppet 36 can be moved downwardly relative to spray head 4 to open a passage through the upper valve opening 42 so that fluid can be delivered to spray orifice 6.

An upper cylindrical flange 44 is coextensively connected to the distal end of poppet 36 so as to surround the poppet valve 38. That is, upper flange 44 is connected at one end thereof to the tubular body of poppet 36. The opposite end of upper flange 44 is open so as to establish a fluid path between upper valve opening 42 and the hollow tubular body (i.e. fluid pressure chamber) of poppet 36 by way of an opening 46 therethrough.

As an important detail of this invention, the presently described pump sprayer 1 is provided with sealing means by which to prevent the inadvertent and premature loss of fluid to the atmosphere. More particularly, the upper cylindrical flange 44 at the distal end of poppet 36 is provided with an outwardly flared upper skirt 48 at the open end thereof and a radially outward extending base 50 at the point where flange 44 is connected to the body of poppet 36. The flared upper skirt 48 of upper cylindrical flange 44 is flexible and, in the at rest condition of FIG. 1, is slidably received within the spray head 4 to form a fluid tight seal against the inner flange 10 thereof and prevent the inadvertent escape of fluid past the interface of flange 10 with upper skirt 48. However, and as will be described when referring to FIG. 5, the downward relocation of poppet 36 relative to spray head 4 will cause the seal between flange 10 and upper skirt 48 to be broken so that a passage is established through which air trapped within a pressure chamber at the hollow interior of poppet 36 can be removed to the liquid container.

An outwardly flared lower skirt 52 is coextensively formed at the proximal end of the tubular body of poppet 36. Like the previously described upper skirt 48, lower skirt 52 is flexible and, in the at rest condition, is slidably received within the hollow bore 31 defined by the accumulator 21 of cap 16 so as to form a seal thereagainst to prevent the escape of fluid past the interface of accumulator 21 with lower skirt 52.

Figure 2:
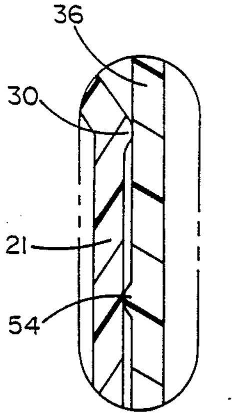
FIG. 2 is an enlarged detail taken from FIG. 1 of a portion of the pump sprayer in an assembled configuration.
Figure 2A:
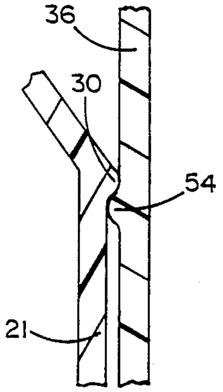
FIG. 2*a* is similar to the enlarged detail of FIG. 2, except that the pump sprayer is in an sub-assembled configuration.

To enable the pump sprayer 1 to be more easily and reliably assembled, a series of outward extending protusions or dimples 54 are molded around the outer periphery of the tubular body of poppet 36. In the sub-assembled configuration represented by FIG. 2*a* of the drawings, wherein the sprayer 1 may be shipped or stored prior to connection to a fluid container, the protrusions 54 of poppet 36 are positioned in contact with the annular rib 30 which extends around the inner periphery of the accumulator 21 of cap 16, whereby the poppet 36 is retained in coaxial alignment with the cap 16 before the spray head 4 is attached thereto. Moreover, and to facilitate high speed, automatic assembly, the effective height of the poppet 36 above the cap 16 is reduced prior to the attachment of spray head 4. In the assembled configuration (best illustrated in FIG. 2 of the drawings), the spray head 4 is attached to cap 16 and the poppet 36 is moved downwardly relative to said cap, whereby the protrusions 54 are moved out of contact with the annular rib 30. Accordingly, the sprayer 1 is now in the at rest condition of FIG. 1 and suitable to be connected to a liquid container.

A coil spring 56 is located within the pressure chamber of the tubular poppet 36 and supported between a pair of oppositely disposed step portions 57 and 58. More particularly, an upper step portion 57 is formed as an area of reduced diameter at the hollow interior of the tubular poppet 36. A lower step portion 58 is formed as an area of reduced diameter at the hollow interior of accumulator 21. The coil spring 56 alternates between relaxed and compressed states during the reciprocal movement of the spray head 4 and the poppet 36 so as to control the up and down strokes of the sprayer 1. Located below the coil spring 56 at the proximal end of accumulator 21 is a lower valve opening 60. A hollow suction tube 62 is connected to the proximal end of accumulator 21 to communicate, by way of the lower valve opening 60, with the pressure chamber formed at the hollow interiors of accumulator 21 and poppet 36. The suction tube 62 is placed within the liquid container so that a supply of liquid can be pumped from the container and dispensed from spray orifice 6 via said tube 62. To prevent the flow of fluid from the pressure chamber of poppet 36, past lower valve opening 60 and back into the container, a ball valve 64 is seated, in the at rest condition of FIG. 1, upon a lower valve seat 66. As will soon be described, the ball valve 64 can be moved off its valve seat 66 during the suction stroke of sprayer 1 to permit fluid to flow past valve opening 60 and towards spray orifice 6.

Figure 3:
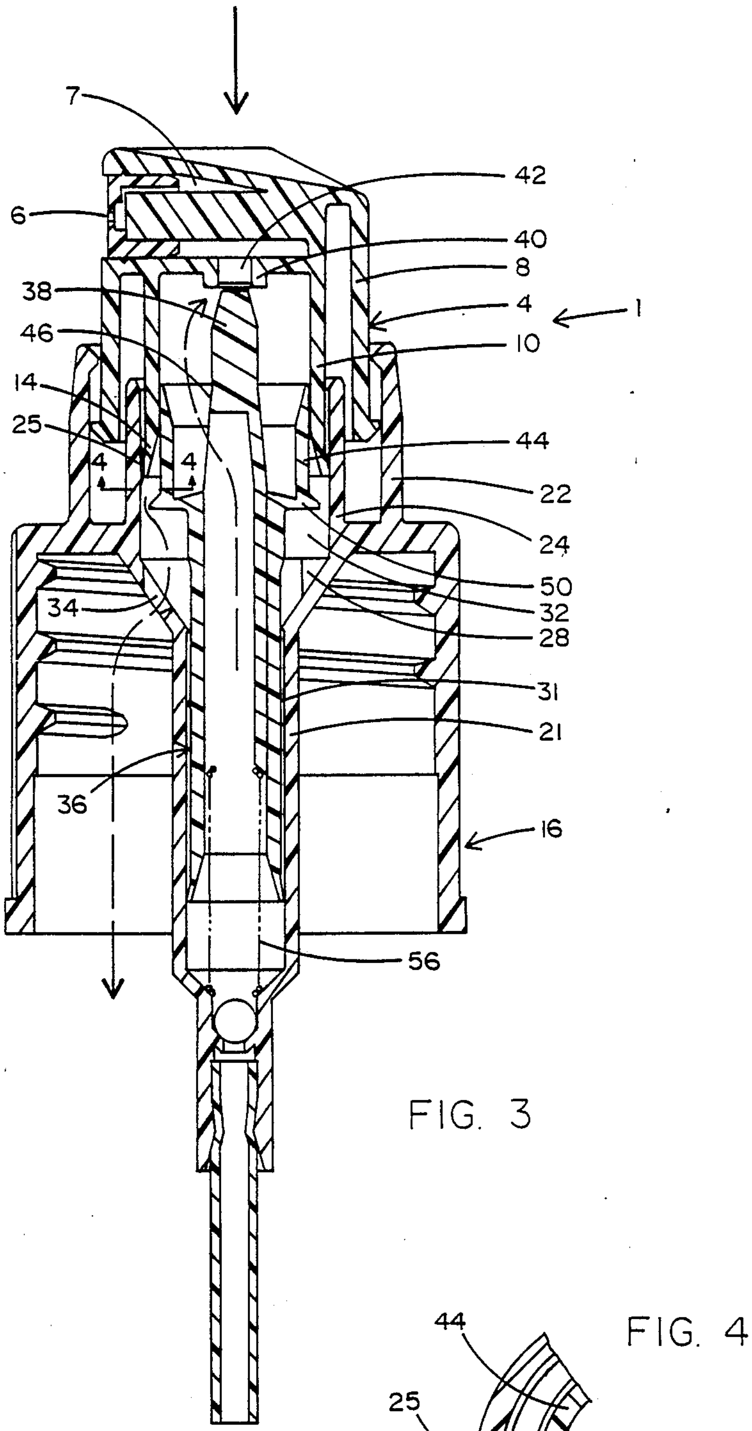
FIG. 3 is a vertical cross-sectional view of the pump sprayer of FIG. 1 during the down stroke when liquid is dispensed from a pressure chamber via a spray orifice and atmospheric air is vented into the liquid container to replace dispensed liquid.

The operation of pump sprayer 1 is now described while referring to FIGS. 3–8 of the drawings. FIG. 3 represents the pressure build-up within pump sprayer 1 during the down stroke phase of operation when it is desirable to vent atmospheric air into the container at a predetermined location so as to replenish the liquid which has been dispensed therefrom. Accordingly, the hood (designated 2 in FIG. 1) is detached from the sprayer to expose the spray head 4. A proximally directed pressure is manually applied to spray head 4 (in the direction indicated by the referenced arrow) so as to cause the spray head to be relocated downwardly relative to cap 16. More particularly, the outer and inner flanges 8 and 10 of spray head 4 are caused to slide downwardly along the outer and inner walls 22 and 24, respectively, of cap 16 until the flexible skirt 14 of inner flange 10 rides over the venting rib 25 of inner wall 24 within the relatively large bore 32 of cap 16.

Figure 4:
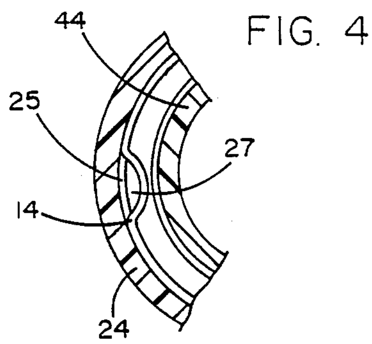
FIG. 4 is a cross-section taken along lines 4—4 of FIG. 3.

As is best shown in FIG. 4, the receipt of skirt 14 upon rib 25 separates the inner flange 10 from inner wall 24 and breaks the seal (previously described when referring to the at rest condition of FIG. 1) between the flexible skirt 14 and the inner wall 24 of cap 16. Hence, a narrow air passage 27 is established between skirt 14 and inner wall 24 through which air is vented from the atmosphere into the liquid container by way of a path including vent hole 34, air passage 27, and the existing space between the outer flange 8 of spray head 4 and the walls 22 and 24 of cap 16. While the establishment of air passage 27 for venting atmospheric air into the container has been described in FIG. 3 during the down stroke, it is to be understood that said passage 27 is also established during the up stroke when an equal volume of air is also vented into the container.

After the pump sprayer 1 has been stroked a few times and the pressure chamber at the hollow interiors of poppet 36 and accumulator 21 has been filled with liquid from the container, a subsequent stroke causes the poppet 36 to overcome the normal bias of the compression spring 56 and move downwardly through the accumulator 21 to compress the fluid therewithin. The downward relocation of poppet 36 is reflected by a pressure change within the continuously extending bores 31 and 32 of cap 16 to thereby cause the poppet valve 38 to move off its upper valve seat 40 and allow fluid communication between spray orifice 6 and the fluid filled pressure chamber of poppet 36. More particularly, liquid is dispensed, under pressure, from the sprayer 1 along a fluid path which is established from the pressure chamber of poppet 36 to spray orifice 6 by way of the opening 46 through poppet 36, upper valve opening 42, and the fluid passage 7 of spray head 4. At the same time, the proximal relation of poppet 36 correspondingly moves the upper poppet flange 44 and the radially projecting base 50 thereof towards the priming step 28 for a purpose that will be described in detail when referring to FIGS. 5–7.

Figure 6:
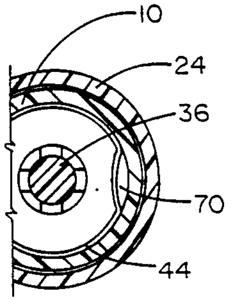
FIG. 6 is a cross-section taken along lines 6—6 of FIG. 5.
Figure 7:
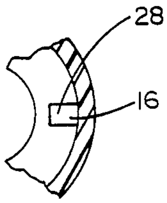
FIG. 7 is a cross-section taken along lines 7—7 of FIG. 5.

FIGS. 5–7 of the drawings show the pump sprayer 1 at the bottom of the down stroke after the manual force being applied to the spray head 4 has been terminated. As previously indicated while referring to FIG. 3, the cylindrical upper poppet flange 44 of poppet 36 is relocated downwardly during the down stroke and through the relatively large upper bore 32 of cap 16, while the hollow tubular body of poppet 36 is relocated downwardly through the relatively narrow bore 31 thereof, such that compression spring 56 is fully compressed, at the bottom of the down stroke, between the upper and lower step portions 57 and 58. Likewise, the inner flange 10 of spray head 4 is moved off the venting rib 25 of the inner wall 24 of cap 16 to reestablish the seal therebetween, and the poppet valve 38 is returned into receipt against the upper valve seat 40 to once again close the fluid passage through upper valve opening 42.

What is more, the downward relocation of upper poppet flange 44 causes the radially outward projecting base 50 thereof to be moved into contact with the inwardly projecting priming step 28 within the relatively large bore 32 of cap 16. Accordingly, the engagement of priming step 28 by base 50 at the bottom of the down stroke causes the upper poppet flange 44 to be deflected within the large bore 32, whereby the seal, which was previously established between the upper poppet flange 44 and the inner flange 10 of spray head 4, is broken. That is to say, the flexible upper poppet flange 44 is rotated slightly through the large bore 32 to create an air passage 70 between poppet flange 44 and one side of inner flange 10 for the purpose of venting trapped air (but not liquid) from the pressure chamber of accumulator 21 and poppet 36 into the container so as to facilitate priming the sprayer 1 and improve the hydraulic pumping action thereof, such that less pressure must be applied to spray head 4 and a fewer number of piston strokes are required of poppet 36 before the sprayer can be suitably primed to dispense liquid.

Figure 8:
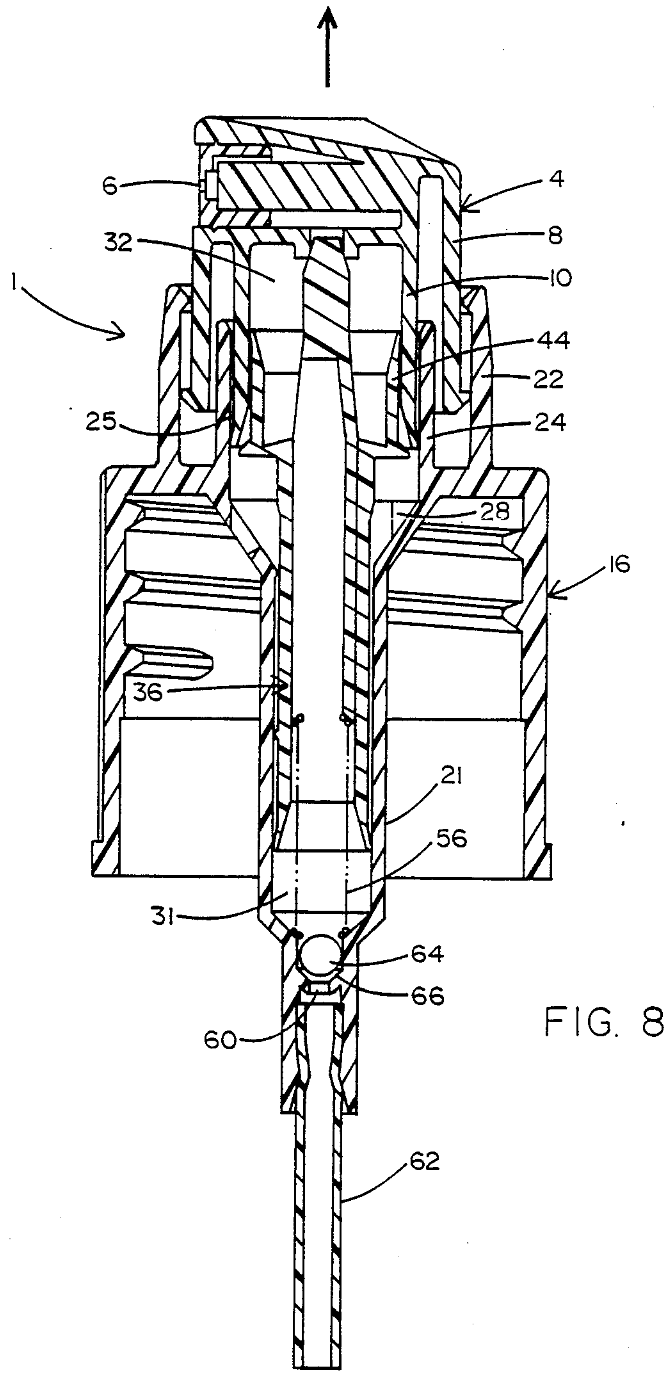
FIG. 8 is a vertical cross-sectional view of the pump sprayer of FIG. 1 during the up stroke when fluid to be dispensed is drawn into the pressure chamber via a suction tube and a valve opening.

Referring now to FIG. 8 of the drawings, the pump sprayer 1 is shown during the up or suction stroke of operation, where the compression spring 56 begins to expand towards its normal, relaxed state. Accordingly, the tubular body portion and the cylindrical upper flange 44 of poppet 36 are moved, by the memory of spring 56, upwardly through the continuously extending small and large bores 31 and 32, respectively, of cap 16 to automatically drive spray head 4 upwardly, and in the direction indicated by the reference arrow, through cap 16 towards the at rest condition (of FIG. 1). Thus, the upper top flange 44 is moved out of contact with priming step 28 and the seal between flange 44 and the inner flange 10 of spray head 4 is reestablished. Moreover, and in a similar fashion to that described while referring to the down stroke of FIG. 3, the outer and inner flanges 8 and 10 of spray head 4 slide upwardly through cap 16 against the outer and inner walls 22 and 24, respectively, thereof so that an additional volume of atmospheric air can be vented into the container as inner flange 10 passes over venting rib 25.

What is more, the upward relocation of poppet 36 through the relatively small bore 31 of cap 16 (at the accumulator 21) creates a suction effect within said bore 31. Accordingly, the ball valve 64 is momentarily pulled off the lower valve seat 66 to open a fluid passage between suction tube 62 and bore 31 via lower valve opening 60. However, the distance ball valve 64 can travel off its valve seat 66 is limited by the bottom of spring 56. Hence, liquid can be drawn from the container, through suction tube 62 and opening 60, into the pressure chamber formed at the hollow interiors of accumulator 21 and poppet 36. Therefore, after a relatively few stroke cycles, the pump sprayer 1 will be fully primed and ready to dispense the liquid through the spray orifice 6 thereof during the down stroke of FIG. 3.

As may be appreciated by those skilled in the art, the presently disclosed pump sprayer 1 expels air, and not liquid, during priming. Some conventional pump sprayers are known to prime both air and liquid, such that some liquid is lost back into the container leaving less volume of liquid to be sprayed to the consumer. Therefore, the pump sprayer 1 of this invention is capable of efficiently pumping a greater volume of liquid in a shorter time. As will also be appreciated, the upper valve seat 40 is located proximally of and below the spray orifice 6 and fluid passages 7. Hence, the amount of air trapped within the pressure chamber 6 at the interior of accumulator 21 and poppet 36 is minimized, such that less stroke cycles and a shorter time are needed to fully prime the sprayer 1 so as to be ready to dispense liquid through spray orifice 6.

It will be apparent that while a preferred embodiment of the invention has been shown and described, various modifications and changes may be made without departing from the true spirit and scope of the invention.

I claim:

1. A manually operated, pressure build-up pump sprayer for dispensing a liquid from a container, said sprayer comprising:

cap means to be removably connected to said container, said cap means having first and second coextensively interconnected and coaxially aligned bores, the first of said bores having a larger diameter than the second bore;

poppet means having a hollow pressure chamber extending axially therethrough to communicate fluidically with said container, said poppet means being received within and slidable reciprocally through the first and second bores of said cap means;

spray head means having a spray orifice and being interconnected with and slidable relative to said cap means in response to a manually applied force, the relocation of said spray head means relative to said cap means causing said poppet means to slide through said cap means so that the pressure chamber of said poppet means will be filled with liquid from the container to be dispensed from said chamber via said spray orifice;

a flange extending radially outward from said poppet means for contacting said spray head means and forming a seal thereagainst; and a step extending radially inward from said cap means, said flange being moved into contact with said step when said poppet means slides through the first and second bores of said cap means such that said flange is displaced from said spray head means and the seal thereagainst is broken to establish a passage through which trapped air can be vented from the pressure chamber of said poppet means to the liquid container.

2. The pump sprayer recited in claim 1, wherein said spray head means has a normally closed valve opening formed therein and extending in fluid communication between said spray orifice and the pressure chamber of said poppet means, the selective opening of said valve opening permitting liquid to be dispensed by way of a fluid path including said pressure chamber, said valve opening, and said spray orifice.

3. The pump sprayer recited in claim 2, wherein said valve opening is normally closed by a poppet valve formed at one end of said poppet means for receipt within said valve opening, said poppet valve being moved out of said valve opening in response to a pressure change within the first and second bores of said cap means caused by the manual application of a force to said spray head means.

4. The pump sprayer recited in claim 3, further comprising spring means to bias said poppet means within the first and second bores of said cap means so that the poppet valve of said poppet means is normally located within said valve opening, said spring means being surrounded by said poppet means and extending from the pressure chamber thereof into said second bore of relatively small diameter.

5. The pump sprayer recited in claim 4, further comprising a normally closed valve opening formed through said cap means and communicating fluidically between the liquid container and the pressure chamber of said poppet means; and valve means positioned within said valve opening to thereby prevent the passage of liquid therethrough, said valve means being moved away from said valve opening and into contact with one end of said spring means at the second bore of said cap means so as to open a fluid passage through said valve opening and permit said pressure chamber to be filled with liquid from the container thereof as said poppet means slides through the first and second bores of said cap means.

6. The pump sprayer recited in claim 2, wherein said normally closed valve opening is located below said spray orifice.

7. The pump sprayer recited in claim 1, further comprising a venting rib located at said cap means and projecting into the first of said bores thereof having a relatively large diameter, said venting rib being engaged by said spray head means when said spray head means slides relative to said cap means for establishing an air passage therebetween through which atmospheric air can be vented into the container to replace the liquid that has been dispensed therefrom.

8. The pump sprayer recited in claim 1, wherein said step extends radially inward from said cap means into the first bore thereof of relatively large diameter.

9. The pump sprayer recited in claim 1, further comprising a rib extending around the periphery of said cap means within the second bore thereof and a series of protrusions extending around the exterior of said poppet means, said rib and said protrusions engaging one another prior to the interconnection of said spray head means to said cap means for temporarily retaining said poppet means at a fixed position with the first and second bores of said cap means.

10. A pressure build-up pump sprayer to be attached to a container for dispensing liquid therefrom, said sprayer comprising:

cap means to be removably connected to the container, said cap means having a hollow bore extending axially and continuously therethrough;

poppet means having a hollow pressure chamber formed therein to communicate fluidically with the container, said poppet means being received within and movable reciprocally through the bore of said cap means;

spray head means having a spray orifice and being arranged in sealing engagement around said poppet means and slidable through the bore of and in sealing engagement with said cap means in response to a manually applied force, the relocation of said spray head means relative to said cap means causing said poppet means to move through the bore of said cap means so that the pressure chamber of said poppet means is filled with liquid from the container to be dispensed from said chamber via said spray orifice; and first venting means extending from said cap means into the bore thereof to engage said poppet means as said poppet means moves through said bore, said first venting means displacing said poppet means out of sealing engagement with said spray head means to establish a passage therebetween through which trapped air within the pressure chamber of said poppet means is vented into the container.

11. The sprayer recited in claim 10, wherein said spray head means has a normally closed valve opening formed therein and located below the spray orifice thereof, said valve opening extending in fluid communication between said spray orifice and the pressure chamber of said poppet means, such that the selective opening of said valve opening permits liquid to be dispensed by way of a fluid path including said pressure chamber, said valve opening, and said spray orifice.

12. The sprayer recited in claim 11, wherein said valve opening is normally closed by a poppet valve formed at one end of said poppet means for receipt within said valve opening, said poppet valve being moved out of said valve opening in response to a pressure change within the bore of said cap means caused by the manual application of a force to said spray head means.

13. The sprayer recited in claim 12, further comprising spring means to bias said poppet means within the bore of said cap means so that the poppet valve of said poppet means is normally located within said valve opening, said spring means being surrounded by said poppet means and aligned coaxially with the pressure chamber thereof.

14. The sprayer recited in claim 10, further comprising second venting means extending from said cap means into the bore thereof so as to displace said spray head means as said spray head means slides through said bore to establish a passage between said cap means and said spray head means through which atmospheric air can be vented into the container to replace the liquid that has been dispensed therefrom.

15. The sprayer recited in claim 14, wherein the continuously extending bore of said cap means has coextensively interconnected sections of relatively large and small diameter, each of said first and second venting means projecting from said cap means into the bore thereof within the section of relatively large diameter.

16. The sprayer recited in claim 14, wherein said second venting means is a rib extending radially inward from said cap means into the bore thereof to engage and displace said spray head means as said spray head means slides through said bore.

17. The sprayer recited in claim 10, wherein said first venting means is a projection extending radially inward from said cap means into the bore thereof, said poppet means having a flange extending radially outward therefrom and into said bore to engage the projection of said cap means within said bore as said poppet means moves through said bore.

18. The sprayer recited in claim 10, wherein the continuously extending bore of said cap means has coextensively interconnected sections of relatively large and small diameter arranged in fluid communication between the container and the spray orifice of said spray head means, said spray head means being slidable through the bore of said cap means within the section of relatively large diameter.

19. The sprayer recited in claim 10, wherein the pressure chamber of said poppet means extends continuously and axially therethrough so as to be aligned coaxially with respect to the bore of said cap means.

20. A pressure build-up pump sprayer to be attached to a container for dispensing liquid therefrom, said sprayer comprising:

cap means to be removably connected to the container said cap means having a hollow bore extending axially and continuously therethrough;

poppet means having a hollow pressure chamber formed therein to communicate fluidically with the container, said poppet means being received within and movable reciprocally through the bore of said cap means;

spray head means having a spray orifice and being arranged in sealing engagement around said poppet means and slidable through the bore of and in sealing engagement with said cap means in response to a manually applied force, the relocation of said spray head means relative to said cap means causing said poppet means to move through the bore of said cap means so that the pressure chamber of said poppet means is filled with liquid from the container to be dispensed from said chamber via said spray orifice;

sealing means extending radially outward from said poppet means for contacting said spray head means and forming a seal thereagainst; and venting means extending radially inward from said cap means, said sealing means being moved into contact with said venting means when said poppet means moves through the bore of said cap means such that said sealing means is displaced from said spray head means and the seal thereagainst is broken to establish a passage through which trapped air can be vented from the pressure chamber of said poppet means to the container.

* * * * *